Figure 1:
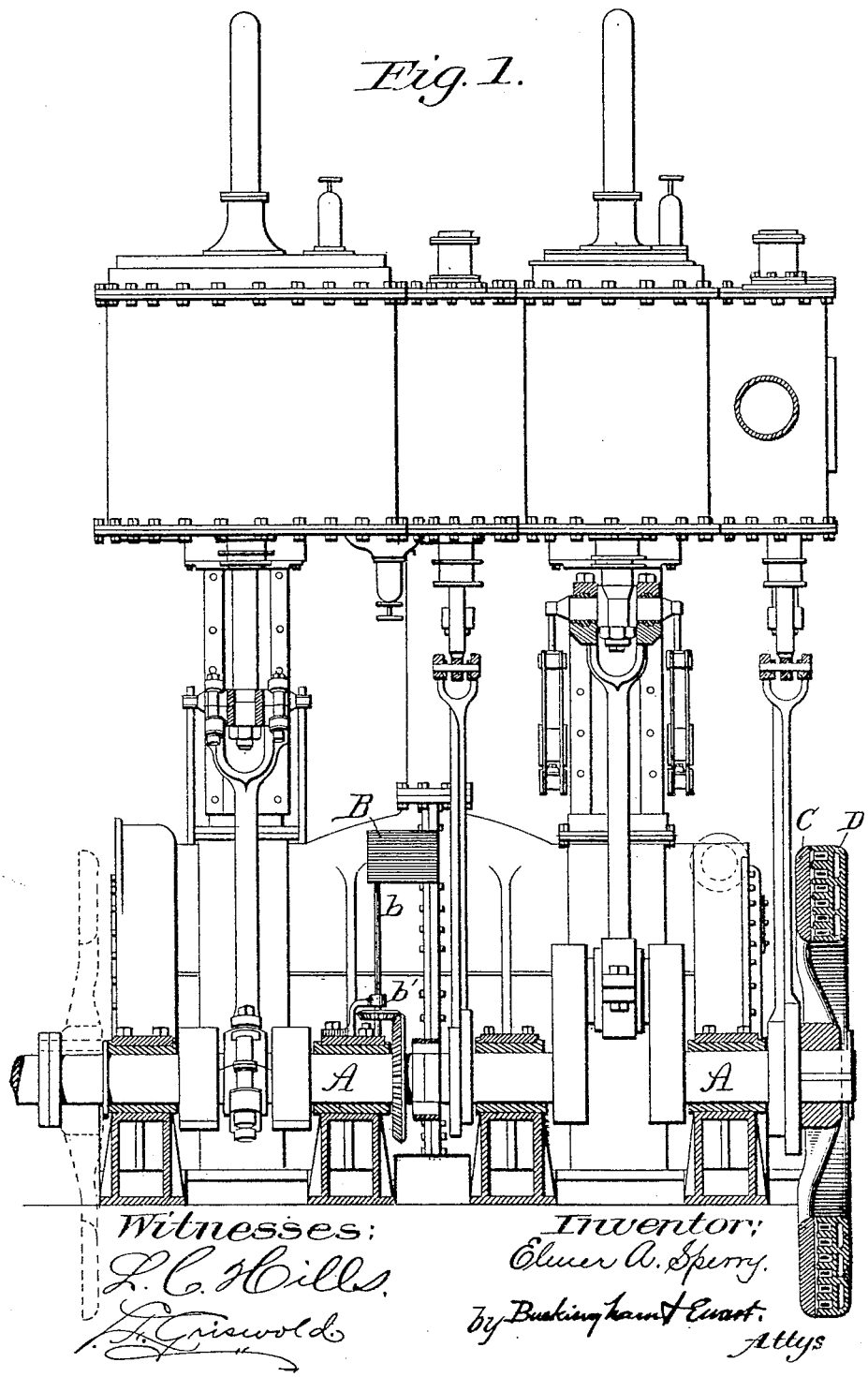

No. 660,318. Patented Oct. 23, 1900.
E. A. SPERRY.
APPARATUS FOR GOVERNING AND CONTROLLING MARINE OR OTHER ENGINES.
(Application filed Sept. 11, 1899.)

(No Model.) 8 Sheets—Sheet 2.

No. 660,318. Patented Oct. 23, 1900.
E. A. SPERRY.
APPARATUS FOR GOVERNING AND CONTROLLING MARINE OR OTHER ENGINES.
(Application filed Sept. 11, 1899.)

(No Model.) 8 Sheets—Sheet 3.

Attest:
Robt. S. Dutton.
Wm. H. Somerwell.

Inventor:
Elmer A. Sperry
By Howell Bartle
Associate Attorney

No. 660,318. Patented Oct. 23, 1900.
E. A. SPERRY.
APPARATUS FOR GOVERNING AND CONTROLLING MARINE OR OTHER ENGINES.
(Application filed Sept. 11, 1899.)
(No Model.) 8 Sheets—Sheet 4.
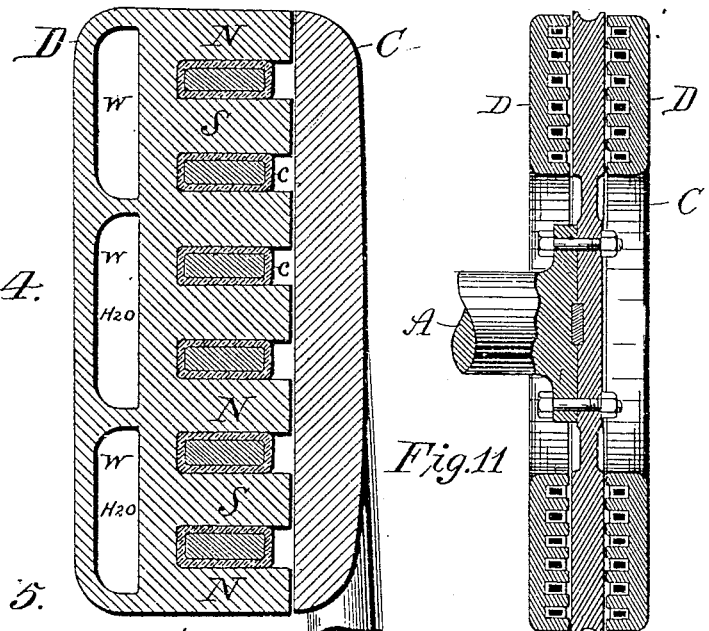
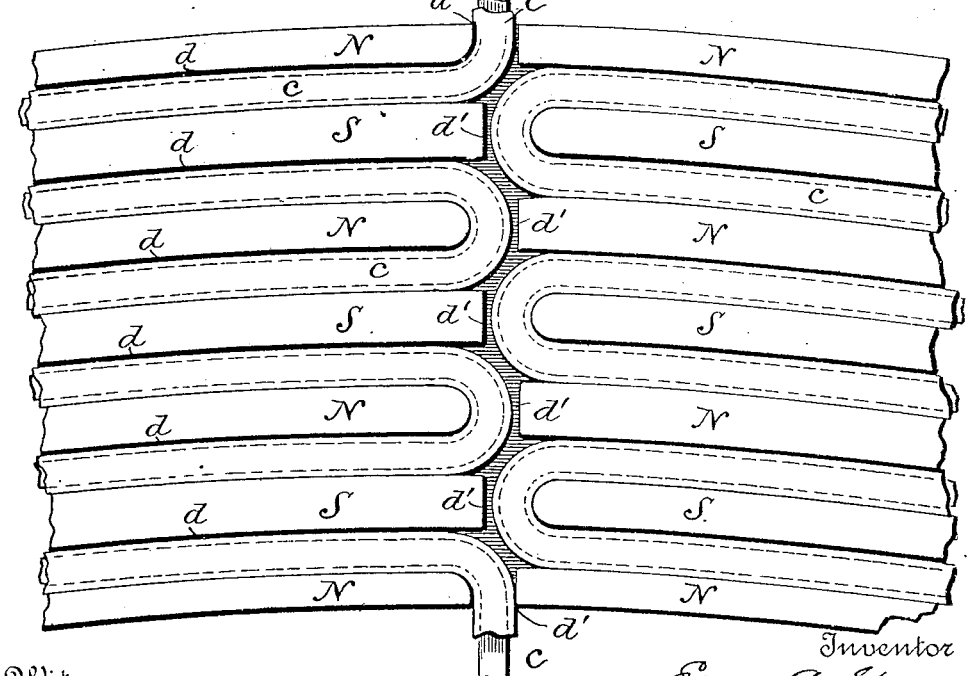

No. 660,318. Patented Oct. 23, 1900.
E. A. SPERRY.
APPARATUS FOR GOVERNING AND CONTROLLING MARINE OR OTHER ENGINES.
(Application filed Sept. 11, 1899.)
(No Model.) 8 Sheets—Sheet 5.

Witnesses
L. C. Hills.
F. Griswold.

Inventor
Elmer A. Sperry.
By Buckingham & Ewart.
Attorneys

No. 660,318. Patented Oct. 23, 1900.
E. A. SPERRY.
APPARATUS FOR GOVERNING AND CONTROLLING MARINE OR OTHER ENGINES.
(Application filed Sept. 11, 1899.)
(No Model.) 8 Sheets—Sheet 6.

No. 660,318. Patented Oct. 23, 1900.
E. A. SPERRY.
APPARATUS FOR GOVERNING AND CONTROLLING MARINE OR OTHER ENGINES.
(Application filed Sept. 11, 1899.)
(No Model.) 8 Sheets—Sheet 7.
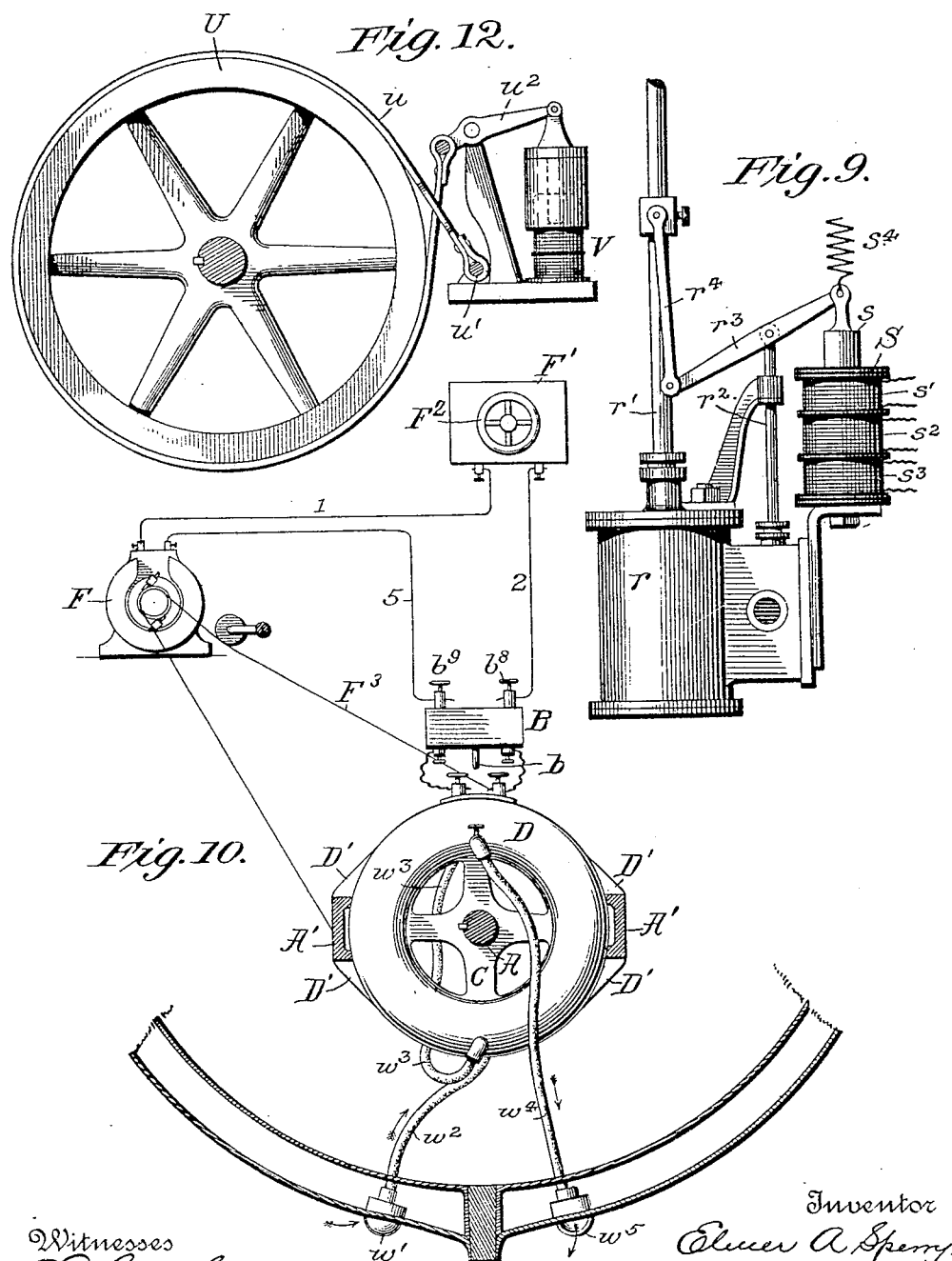

No. 660,318. Patented Oct. 23, 1900.
E. A. SPERRY.
APPARATUS FOR GOVERNING AND CONTROLLING MARINE OR OTHER ENGINES.
(Application filed Sept. 11, 1899.)
(No Model.) 8 Sheets—Sheet 8.
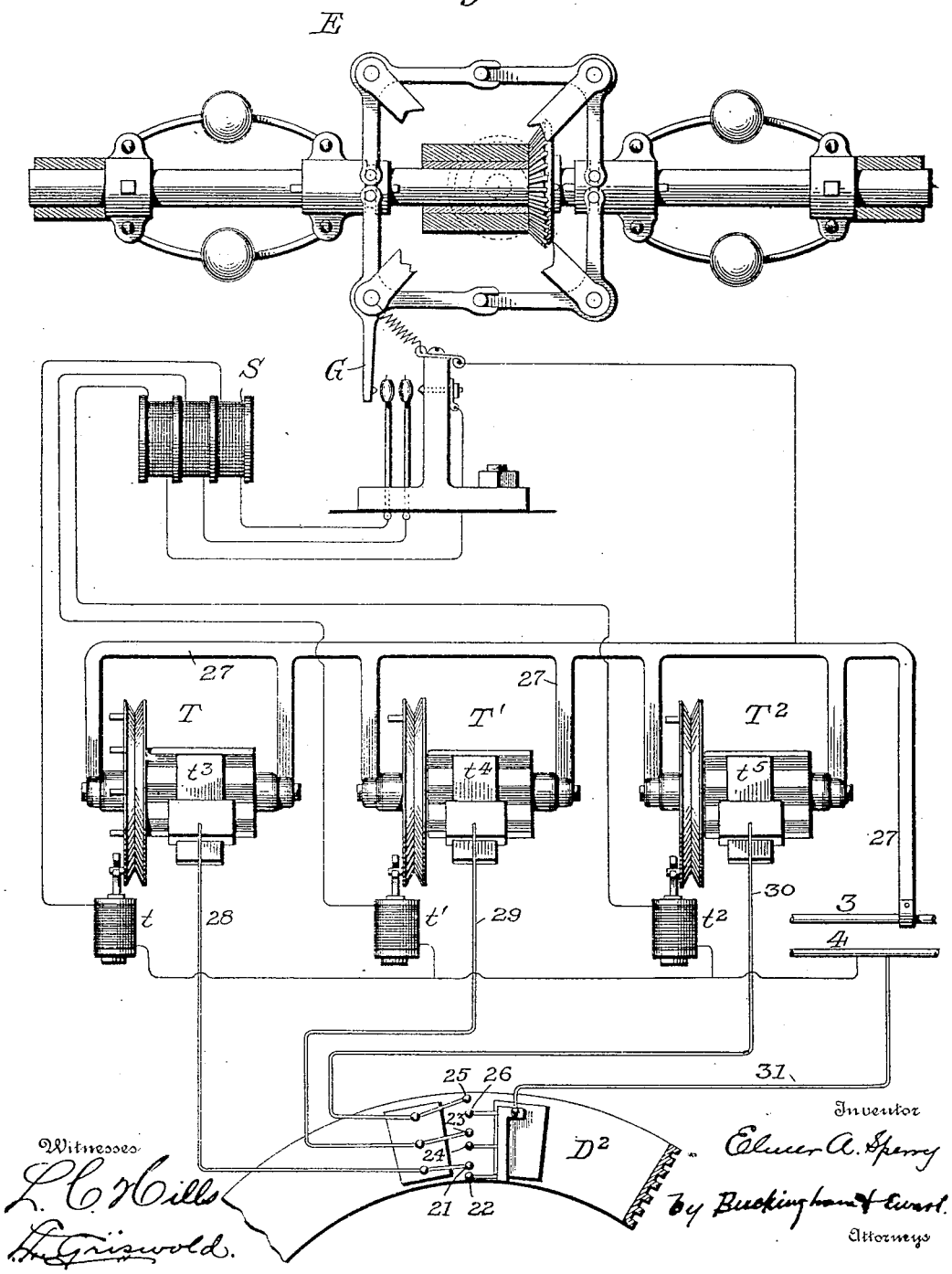

UNITED STATES PATENT OFFICE.

ELMER A. SPERRY, OF CLEVELAND, OHIO.

APPARATUS FOR GOVERNING AND CONTROLLING MARINE OR OTHER ENGINES.

SPECIFICATION forming part of Letters Patent No. 660,318, dated October 23, 1900.

Application filed September 11, 1899. Serial No. 730,196. (No model.)

*To all whom it may concern:*

Be it known that I, ELMER A. SPERRY, a citizen of the United States, residing at Cleveland, in the county of Cuyahoga and State of Ohio, have invented certain new and useful Improvements in Apparatus for Governing and Controlling Marine or other Engines; and I do hereby declare that the following specification, taken in connection with the drawings furnished and forming a part of the same, is a clear, true, and complete description of my invention.

My invention relates to apparatus for governing and controlling the speed of marine and other engines; and it has for its object the maintaining of a regular and uniform speed or to hold same within certain predetermined limits, regardless of varying conditions which may operate to diminish or increase the amount of work being performed or the load being carried by the engine during its continuous operation.

My invention has been devised more especially for use in connection with marine engines where the load carried varies between extremely wide limits and often instantaneously from full load to no load at all, as where, from the pitching of the ship, the propeller is suddenly raised from a well-submerged position entirely out of the water. The racing of marine engines incident to sudden variations in the load, and the consequent racking and disintegrating of the parts thereof, as well as of the ship as a whole, has always been a factor requiring serious consideration in the designing and construction of engines of this type, and the speed capacity of such engines has been necessarily limited to the efficiency of known governing systems or devices to maintain complete and instant control of the maximum speed. In governing apparatus now in use the speed control is regulated by diminishing or increasing the motive power of the engine, as by opening or closing the throttle; but the reactionary mechanical appliances used are wholly inadequate to meet the conditions now demanded in engines of the marine type. As is well known, racing occurs in all high-speed marine engines even after the mechanical governor has cut off the steam-supply; but it occurs to a much greater extent in engines of the compound type, this being due to the presence of steam in the receivers and the vacuum acting on the pistons of the intermediate and low pressure cylinders. There is a constantly-increasing demand for engines of greater capacity and speed than can be controlled by the governing systems now in use, and my invention has been devised not only to insure prompt and efficient speed control of engines as now built and operated, but to enable the working speed of such engines to be increased almost indefinitely within the maximum limits without liability of danger.

My invention consists, primarily, in automatically applying, withdrawing, and varying an artificial load upon an engine or prime mover acting either alone or in conjunction with other governing or controlling devices, the artificial load being applied, varied, and withdrawn in inverse proportion to variations in the working load carried by the engine. This artificial load is applied to a moving part of or a part moved by the engine in one of its forms by means of braking mechanism controlled by a system of electric circuits and devices which are thrown into or out of action by a mechanical governor operating in the usual manner.

After a detail description of my invention the features deemed novel will be specified in the claims hereunto annexed.

Figure 2:
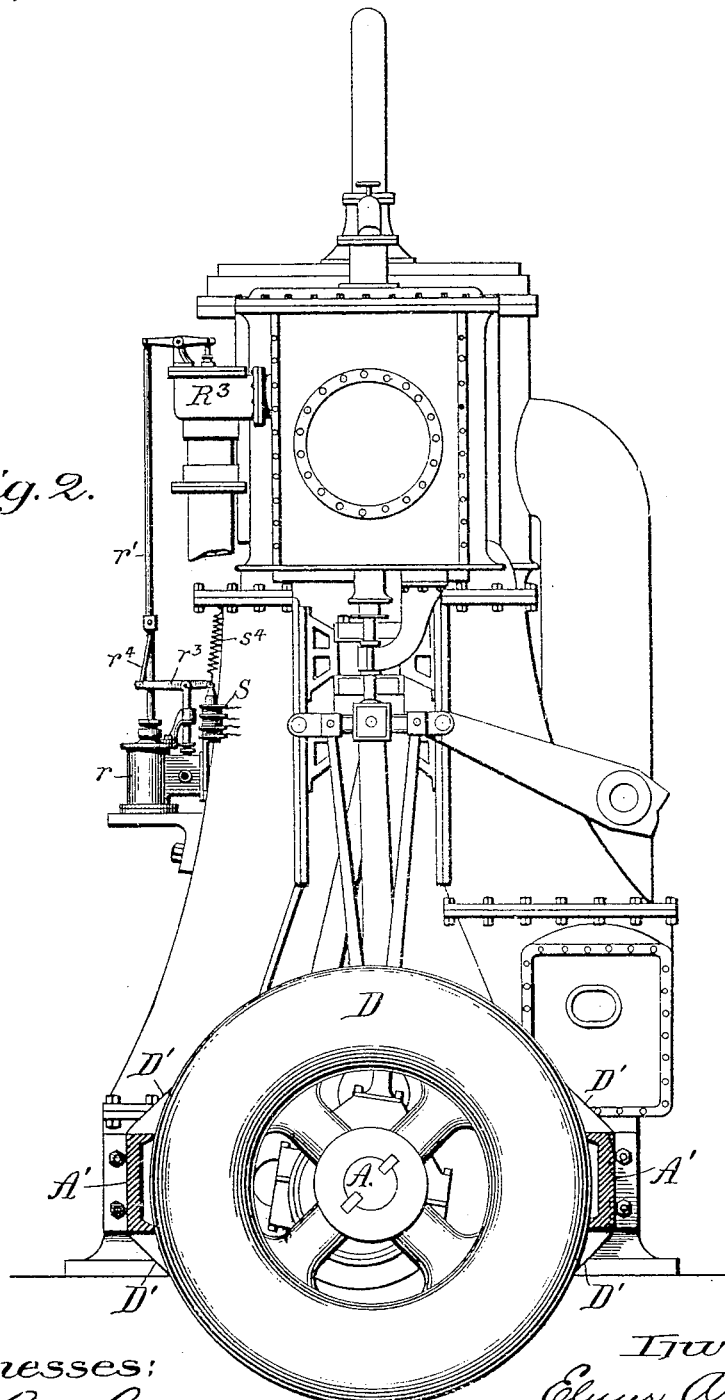
Figure 3:
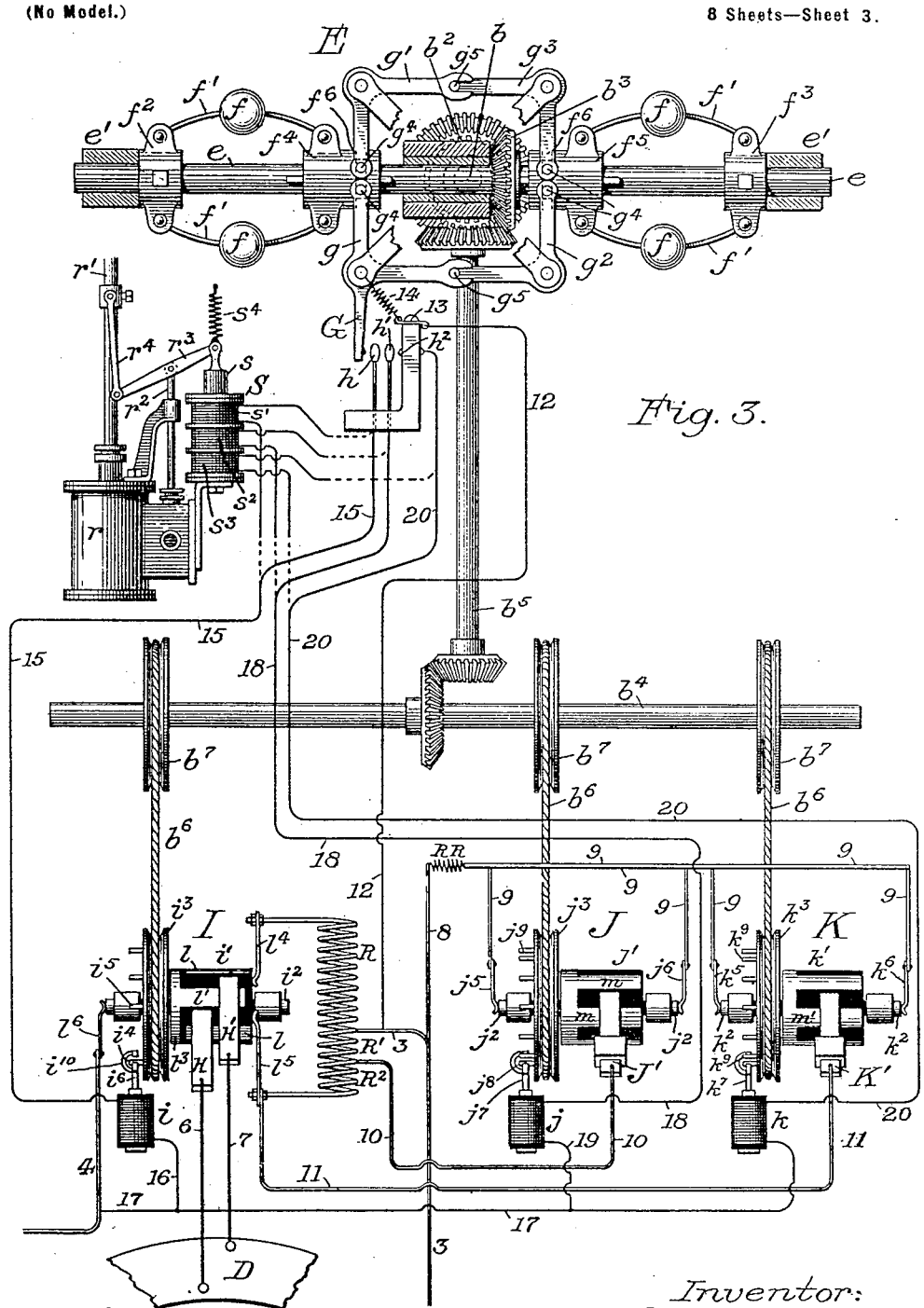
Figure 6:
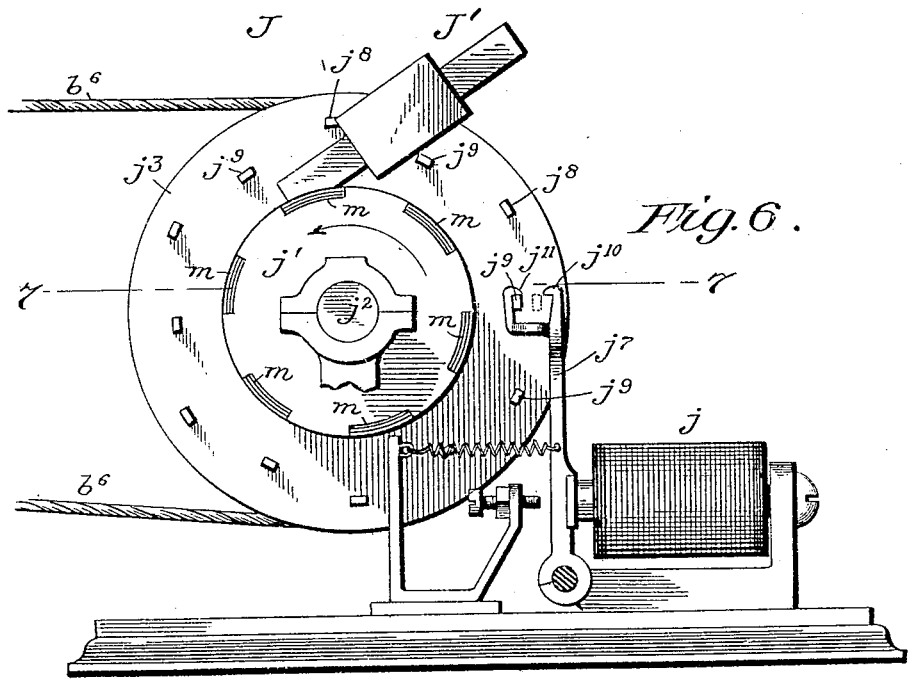
Figure 7:
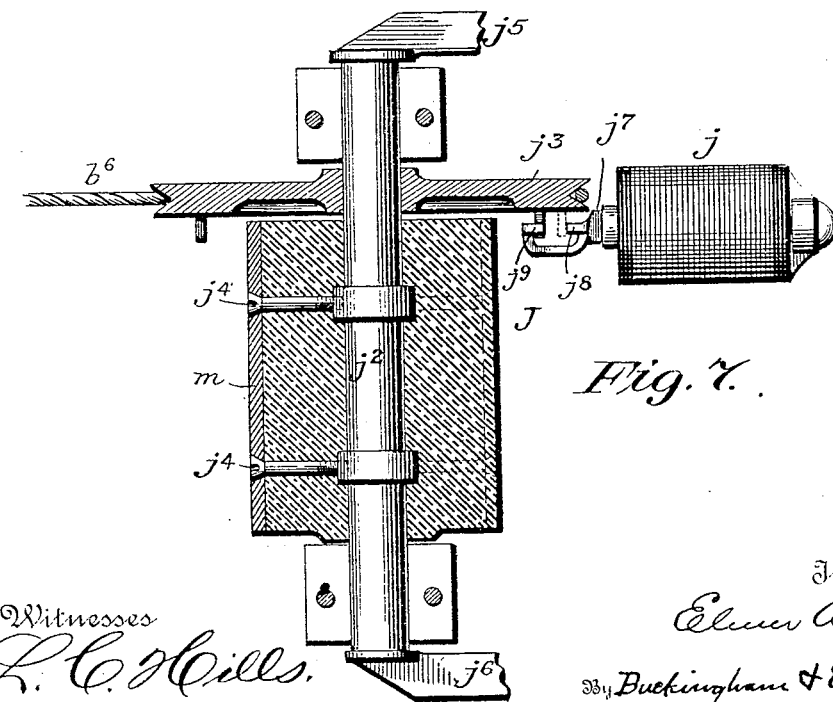
Figure 8:
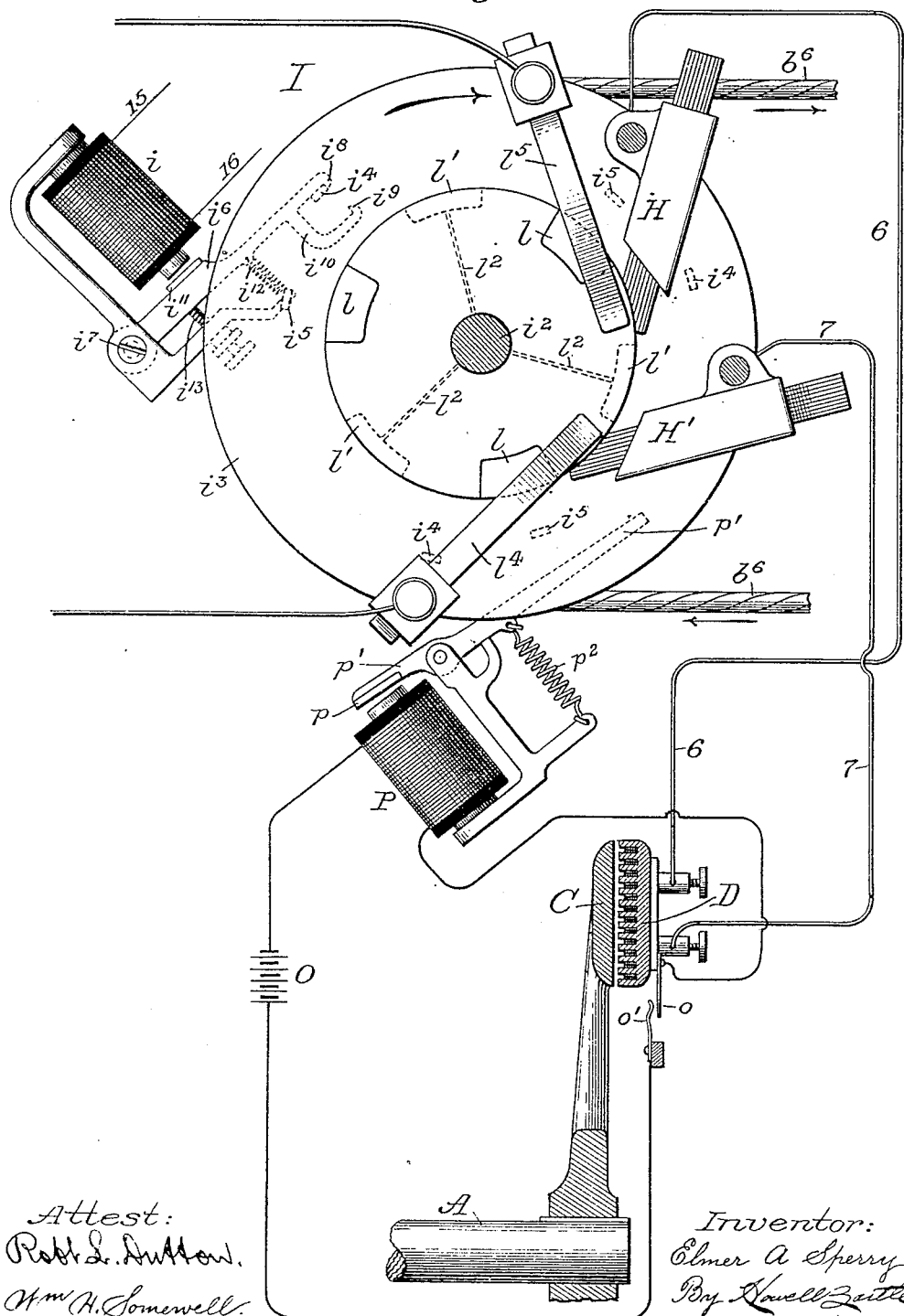

Referring to the drawings, Figure 1 illustrates a marine engine, partly in side elevation and partly in section, to which my governing apparatus has been applied. Fig. 2 is a front view of the engine of Fig. 1. Fig. 3 is a diagrammatic illustration of the devices and electric circuits controlling the braking mechanism. Fig. 4 is a section of the electric brake shown in Fig. 1. Fig. 5 is a face view of a portion of said brake. Figs. 6 and 7 are detail views of one of the mechanically-driven circuit-controllers illustrated in Fig. 3. Fig. 8 illustrates the main circuit-controller in end view and a portion of the electric brake in sectional view and their electric connections. Fig. 9 is a detail of the throttle-controlling mechanism. Fig. 10 is a diagrammatic view illustrating the main circuits and the water-circulating system of the electric brake. Fig. 11 is a sectional view of a preferred form of electric brake. Fig. 12 is a side view of a mechanical brake adapted for use in connection with my system. Fig. 13 is a diagrammatic illustration of a modified form of brake-controlling apparatus embodying the main features of my invention.

It is to be understood that while I have illustrated my invention in connection with a marine engine it is applicable to engines generally, without regard to the particular form thereof or the use to which they may be put.

In the engine shown in Figs. 1 and 2 the crank-shaft A is directly under the control of the governing mechanism, the artificial load being applied thereto or removed therefrom in inverse proportion to variations in the actual load by means of a brake controlled as hereinafter explained. The brake itself may be in the form of a mechanical brake of any of the well-known types—such, for instance, as illustrated in Fig. 12—but I prefer to use an electrical brake because of its great power and the ease with which it may be controlled. The brake illustrated in Figs. 1 and 2 and in detail in Figs. 4 and 5 consists of an electromagnet D, which operates against the face of a wheel or disk C, the latter being keyed to the shaft A and constructed, by preference, of rolled or pressed steel. As illustrated in Figs. 1 and 2, the disk C is secured to the forward end of the shaft A; but it may be secured to the aft end, as illustrated in dotted lines in Fig. 1, or to any other rotating part of the engine. The electromagnet D is arranged in juxtaposition to the disk C and consists of a ring of soft iron surrounding the shaft A concentric to the axis of the disk. The magnet D is supported at each side at its outer edges by means of lugs D' D' D' D', which embrace suitable supporting beams or blocks A' A', secured to the engine-bed, as clearly shown in Fig. 2. The magnet is thus held against rotation, but it is free to slide upon the supports A' A' toward and from the disk C, the sliding movement being limited by the disk C in one direction and in the other direction by a fixed stop. (Not shown.)

The ring of which the magnet is composed is made of soft iron, and on one side there is a series of concentric grooves or channels $d$, in which is placed the winding or conductors $c$, the metal between the grooves forming the cores and pole-faces N S N S N S. (Clearly shown in Fig. 5.) Radial grooves $d'$ are cut through the projecting metal to allow of turning of the convolutions necessary for proper distribution of the magnet system, the winding being upon three sides only of the projecting metal. The conductors $c$ pass through the radial groove $d'$ at the outer edge of the ring into and around the outer groove $d$ to and through a radial groove $d'$ to the next concentric groove $d$, then around in said groove in a reverse direction to and through a radial groove $d'$ to the next concentric groove $d$, through said third groove in a reverse direction, and so on through all of the grooves to the radial groove $d'$ at the inner edge of the ring, where connection is made with the energizing-circuit.

It will be readily understood that when magnet D is energized its attraction for the disk C will hold the latter against rotation in proportion to its power, which latter will depend upon the strength of the energizing-current as well as upon the number of coils or convolutions through which current is passing. The mechanism for controlling the operation and power of magnet D is contained in a box or casing B, (shown in Figs. 1 and 10,) which may be located at any point convenient for connecting a centrifugal or other mechanical governor. The contents of box B are shown in diagram in Fig. 3, and consist of a centrifugal governor E and other devices I, J, and K for controlling electric circuits, to be presently described. The governor E is mounted on a shaft $e$, supported in suitable bearings $e'$ $e'$, and driven from the engine-shaft A by means of a shaft $b$, geared to the engine-shaft A, as at $b'$, and to the governor-shaft by gears $b^2$ and $b^3$. The governor E consists of a pair of governors of a well-known type, each consisting of a pair of balls or weights $f$, mounted on bow-shaped springs $f'$, pivotally connected at their outer ends to collars $f^2$ $f^3$, fixed to the governor-shaft $e$, and similarly connected at their inner ends to sliding sleeves or collars $f^4$ $f^5$, splined to the shaft $e$, so that the sleeves $f^4$ and $f^5$ will be moved in opposite directions or toward and from each other by the centrifugal action of the balls or weights $f$, as will be readily understood. The two sets of balls are statically balanced by means of four bell-crank levers $g$ $g'$ $g^2$ $g^3$, each pivotally mounted upon suitable supports at four diametrically-opposite points between the two sleeves $f^4$ $f^5$. Levers $g$ and $g'$ are connected to sliding sleeve $f^4$ by pins $g^4$ $g^4$, which project from an arm of each of said levers into an annular groove $f^6$ in the sleeve $f^4$. Levers $g^2$ and $g^3$ are similarly connected to sliding sleeve $f^5$ by pins $g^4$ $g^4$, projecting into a groove $f^6$ in sleeve $f^5$. Levers $g$ and $g'$ are connected to levers $g^2$ and $g^3$, respectively, by pins $g^5$ $g^5$ on levers $g^2$ $g^3$, which are embraced by forked ends of levers $g$ and $g'$. It will thus be seen that by means of the lever connections between the sliding sleeves $f^4$ $f^5$ the two sets of weights are balanced against each other and that the governor cannot therefore be affected by the motion or movements of a ship. Bell-crank lever $g$ is provided with a pendent arm G, which when the balls or weights $f$ are moved outwardly by an increase in the speed of the engine operates to successively close electric circuits, each containing electromagnets which release mechanically-driven switches controlling the operation and power of the artificial load or brake before referred to. Within the path of arm G is a spring-contact $h$, with which said arm engages for closing a circuit containing electromagnet $i$, the latter operating to trip a pawl for releasing a rotary switch I, controlling the initial supply of current to magnet D. A further movement of arm G causes contact $h$ to be moved against a second contact $h'$, which closes a second circuit containing an electromagnet $j$, the latter operating to trip a pawl and release a mechanically-driven switch J, which cuts out a resistance in the main circuit to increase the current supplied to magnet D. A further movement of arm G causes contact $h'$ to move against a third contact $h^2$ and close a third circuit containing electromagnet $k$, which releases a third mechanically-driven switch K, the latter operating to cut out a second resistance and still further increase the current in the main circuit.

The switch I is revolved for making, breaking, and reversing the main current, and the switches J and K are revolved for making and breaking auxiliary circuits when released by the pawls controlled by the electromagnets $i$, $j$, and $k$, respectively; but each switch is revolved only a predetermined distance at each making and breaking of its electromagnet-circuit. The switches may derive their rotary motion in any suitable manner; but I prefer that they be driven by frictional contact with some moving portion of the engine or apparatus, preferably from the shaft $b$, interior to inclosure B. For convenience of illustration I have shown the switches as deriving their rotary motion from a shaft $b^4$, geared to a shaft $b^5$, the latter being geared to the shaft $b$, as shown. Each of the switches I, J, and K consists of a drum or cylinder $i'$ $j'$ $k'$ on a shaft $i^2 j^2 k^2$, mounted in suitable bearings and carrying a band wheel or pulley $i^3 j^3 k^3$, and each band-wheel is coupled by a belt $b^6$ to a pulley $b^7$ on shaft $b^4$. Shaft $b^4$ is in continuous motion during the running of the engine; but the switches do not revolve until permitted to do so by the operation of their pawls, the belts $b^6$ slipping upon the pulleys, while switches remain stationary. The cylinder or drum $i'$ of switch I is provided with six contact-bars equally spaced and separated from each other by insulated spaces which are equal in width to the width of the bars, so that each division of the cylinder occupies one-twelfth of its circumference. The bars $l\ l\ l$ are insulated from each other and from other portions of the device, and the intervening bars $l'\ l'\ l'$ are each electrically connected to the shaft $i^2$, as shown at $l^2$, Fig. 8, and they may also be connected together, as at $l^3$. Two brushes H H' contact with the surface of the cylinder and are arranged so that one will rest on a bar $l$, while the other rests on a bar $l'$, or both on insulated spaces, as shown. At one end of the cylinder are two brushes $l^4\ l^5$, arranged to contact with the ends of contact-bars $l$, which extend to the end of the cylinder. Contact-bars $l'$ do not extend to the end of the cylinder and do not therefore come in contact with the brushes $l^4\ l^5$. A brush $l^6$ bears on the end of shaft $i^2$, and these brushes form connections for the circuits to be described.

Switch I is normally held against rotation by pins $i^4\ i^5$, projecting from pulley $i^3$ in the path of a double-acting pawl $i^6$, controlled by the electromagnet $i$. Pawl $i^6$ (see Fig. 8) is pivoted, as at $i^7$, and at its outer end it is provided with two oppositely-disposed hooks $i^8\ i^9$, connected together by an arched connection $i^{10}$, which permits the pins to pass thereunder to the hooks. Pawl $i^6$ is moved toward the magnet by means of the armature $i^{11}$, to which it is attached, but is normally held away from the magnet by the retractile spring $i^{12}$. An adjusting-screw $i^{13}$ is provided for properly adjusting the movement of the pawl with relation to the pins $i^4\ i^5$. The pins $i^4\ i^4\ i^4$ (shown in dotted lines in Fig. 8) are equally spaced in line to be engaged by the upper hook $i^8$ of the pawl $i^6$ when the latter is in the position shown. The pins $i^5\ i^5\ i^5$ are each arranged thirty degrees or one-twelfth of a circle to the rear of the pins $i^4$ and in line to be engaged by hook $i^9$ when the pawl is moved by the electromagnet $i$.

The cylinder $j'$ of switch J is provided with six contact-bars $m$ equally spaced and separated from each other by insulated spaces of equal width with the bars, and the latter are each connected to the shaft $j^2$, as shown at $j^4$ in Fig. 7. A brush J' bears upon the surface of the cylinder, and at each end of the shaft $j^2$ are contact-brushes $j^5\ j^6$, forming circuit connections to be presently described. On pulley $j^3$ are two sets of pins $j^8\ j^9$, which are alternately engaged by hooks $j^{10}\ j^{11}$ of pawl $j^7$, which is an exact counterpart of the pawl $i^6$, before described.

Switch K is an exact counterpart of switch J and needs no special description.

Current is supplied to the system from a dynamo-generator F, shown in Fig. 10 as being driven from the engine by a belt $F^3$, though any form of generator or source of electric supply may be utilized. Dynamo F is connected by wire 1 to a manually-operated controller F', provided with a hand-wheel $F^2$ for regulating the strength of the current. Controller F' is connected by wire 2 with a binding-post $b^8$ on box B. Binding-post $b^8$ is connected by wire 3 to the resistances R R' $R^2$, the latter being connected to brushes $l^4$ and $l^5$, which bear against the end of cylinder $i'$ of switch I, as clearly shown in Fig. 3. Connected to brush $l^6$ is a wire 4, leading to binding-post $b^9$, Fig. 10, the latter being connected to the dynamo F by wire 5. From brush H a wire 6 leads to one terminal of the winding of magnet D, the other terminal being connected to brush H' by wire 7. From wire 3 a branch wire 8 leads to a resistance R R, which is connected by conductors 9 to the brushes $j^5\ j^6$ and $k^5\ k^6$, which bear on the ends of shafts $j^2$ and $k^2$ of the switches J and K, respectively. Brush J' of switch J is connected by wire 10 with resistance $R^2$, and brush K' of switch K is connected by wire 11 with brush $l^5$ of switch I. From wire 3 a second branch wire 12 leads to a binding post or screw 13, from which a wire 14 extends to bell-crank lever $g$ of the governor, the lever $g$ being insulated from other parts of the device. Contact $h$ is connected by wire 15 to electromagnet $i$, and the latter is connected by wire 16 to a branch wire 17, connecting electromagnet $k$ to wire 4. Contact $h'$ is connected by wire 18 to electromagnet $j$, which in turn is connected by wire 19 to branch wire 17. Contact $h^2$ is connected by wire 20 to electromagnet $k$, the latter being connected by wire 17 to wire 4.

The operation of the system as thus far described is as follows: As soon as the actual load upon the engine decreases sufficiently to cause the speed to rise above normal the balls $f$ of governor E will cause arm G of bell-crank lever $g$ to come in contact with spring-contact $h$, which closes the circuit through electromagnet $i$, the current flowing from generator, through wire 3, wire 12, post 13, wire 14, arm G, contact $h$, wire 15, magnet $i$, wires 16, and wire 17, to wire 4, back to generator. Magnet $i$ being thus energized, pawl $i^6$ is moved thereby for releasing pin $i^4$, with which it was engaged, and switch I is immediately rotated one-twelfth of a revolution by its belt $b^6$, the rotation being stopped by the next pin $i^5$ engaging with hook $i^9$ of the pawl. The brushes H and H', which were before resting on insulated spaces of the cylinder $i'$, are now brought over contact-bars, brush H resting on a bar $l$ and brush H' on a bar $l'$. At the same time brush $l^5$ is brought into contact with the bar $l$ under brush H. The main current from the generator then flows from wire 3, through resistances R' and R², brush $l^5$, contact-bar $l$, brush H, wire 6, to magnet D, through the coils of the magnet to wire 7, brush H', contact-bar $l'$, thence through a connection $l^2$ to shaft $i^2$, through brush $l^6$ and wire 4, back to generator. The magnet D thus energized moves in contact with disk C and by its magnetic force tends to hold the disk against rotation. This action of the magnet puts upon the engine an artificial load which should balance the decrease in actual load that called into action the governing devices, this being regulated by a proper adjustment of the electric contacts controlled by the governor and by the strength of current supplied to the magnet, the latter being regulated by the controller F, Fig. 10. The magnet D continues to act on the disk C until the actual load increases sufficiently to allow the governor E to assume its normal position, when the magnet is instantly withdrawn. Should the actual load continue to decrease beyond the power of the magnet to maintain the normal speed, the balls of governor E will cause arm G to move contact $h$ against contact $h'$, which will close the circuit through electromagnet $j$, the current passing from wire 3, through wire 12, post 13, wire 14, arm G, contacts $h$ and $h'$, wire 18, through magnet $j$ and wires 19 and 17, to wire 4, back to generator. Magnet $j$ being thus energized, pawl $j^7$ is moved thereby from engagement with a pin $j^8$ to the position shown in Fig. 6, and switch J is immediately rotated by its belt $b^6$ one-twelfth of a revolution, or until the next pin $j^9$ is caught by hook $j^{11}$ of the pawl. Brush J', which was before resting on an insulated space, is now brought in contact with a bar $m$, and a circuit is completed which increases the strength of magnet D by cutting out of the circuit a resistance R'. Instead of the current passing from wire 3 through resistance R' it now flows through wire 8, adjustable resistance R R, conductors 9 to switch J, through brushes $j^5$ $j^6$, shaft $j^2$, and conductors $j^4$ to bar $m$, through brush J' and wire 10 to resistance R², and thence through brush $l^5$ and switch I to magnet D, as before. Resistance R' is thus cut out of the circuit and the energy of magnet D proportionally increased; but should the power be still insufficient to hold the speed to normal, governor E continues to move arm G until contact $h'$ is moved against the contact $h^2$, which results in the operation of switch K, the latter cutting out resistance R² in the main circuit and still further increasing the power of magnet D. When contact $h'$ is moved by arm G against contact $h^2$, current flows from wire 3, through wire 12, post 13, wire 14, arm G, contacts $h$, $h'$, and $h^2$, wire 20, to electromagnet $k$, thence by way of wire 17 to wire 4, back to generator. Pawl $k^7$ is moved by magnet $k$, and switch K is revolved one-twelfth of a revolution in the same manner as switch J, before described, so that brush K', which was before resting on an insulated space, is now brought in contact with a bar $m'$. The main current then passes from wire 3, through wire 8, adjustable resistance R R, and conductors 9, to brushes $k^5$ $k^6$, through shaft $k^2$ to the bars $m'$, through brush K' and wire 11 to brush $l^5$, and through switch I and magnet D, as before described. Resistances R' and R² are now out of the main circuit, and the magnet D is brought into direct connection with the generator, barring resistance R R, which is provided for adjusting the strength of current. Any number of switches J K and resistances R' R² may be employed, with corresponding contacts controlled by the governor for intermediate graduations of the braking and governing force.

By employing electricity for applying, varying, and releasing the governing devices the mechanical governor is relieved of actual work beyond making and breaking electric circuits, and as the circuits are closed in quick succession and the closing of each circuit results in increasing the load on the engine the speed control is practically instantaneous and the governor can have no opportunity to move beyond the point necessary to bring into action a power sufficient to equalize any decrease in the actual load that would ordinarily result in an increase of speed.

After the artificial load has been applied it is removed only in proportion to the increase in actual load. When the speed begins to slacken, the governor E opens each circuit in succession, which decreases the artificial load by cutting in resistance after resistance and decreasing the power of magnet D until the actual load is restored to normal, when the artificial load is entirely and instantly withdrawn. When the speed of the engine begins to decrease, the governor E first opens the circuit controlling electromagnet $k$, which instantly releases pawl $k^7$, and the latter is drawn by its spring to its normal or original position. A pin $k^9$ is released by the pawl $k^7$ and the switch K rotated one-twelfth of a revolution, or until the next pin is caught by the outer hook of the pawl. An insulated space is thus brought under brush K' and the circuit broken through said switch. The current then passes through resistance $R^2$ by way of switch J, as explained. When the governor opens the circuit of magnet $j$, switch J is revolved for breaking the circuit in the same manner as switch K, and the current then passes through resistances R' $R^2$ to magnet D, as it did before switch J was brought into action.

Now, referring to Fig. 8, it will be noticed that the pins on pulley $i^3$ are arranged so that the distance from a pin $i^4$ to the next pin $i^5$ is one-twelfth of a circle, and the distance from a pin $i^5$ to the next pin $i^4$ is one-third of a circle. When the switch I is in its normal position, (shown,) a pin $i^4$ is engaged by the pawl $i^6$, and the brushes H and H' rest on insulated spaces between the bars $l$ and $l'$. When magnet $i$ is energized, as already described, pawl $i^6$ releases the pin $i^4$ and engages the next pin $i^5$, the switch being revolved by its belt one-twelfth of a revolution, which brings a bar $l$ beneath brush H and a bar $l'$ beneath brush H', current then passing to magnet D, as already described. When governor E breaks the circuit controlling magnet $i$, pawl $i^6$ is drawn to its original position by the spring $i^{12}$, ready to engage the next pin $i^4$, which will bring the switch to its original open-circuit position; but before the switch reaches its original or normal position it is momentarily arrested in its movement for reversing the circuit and changing the polarity of magnet D, so that the latter will be instantly thrown back from disk C to its original position.

Attached to magnet D is a contact $o$, which when the magnet is in engagement with disk C bears against a contact $o'$ and closes a circuit through battery O and an electromagnet P, as clearly shown. When magnet P is energized, it attracts an armature $p$ and moves a lever $p'$ in the path of the pins $i^4$ on pulley $i^3$, and said lever is so located that it will engage a pin $i^4$ and arrest the movement of the switch at the moment a bar $l'$ is beneath brush H and a bar $l$ beneath brush H', allowing the switch to make one-sixth of a revolution. In this position of the switch brush $l^5$ will be resting on insulation and brush $l^4$ will be in contact with the bar $l$ under brush H', and current will pass from wire 3, through resistance R, brush $l^4$, bar $l$, brush H', wire 7, and in a reverse direction through magnet D, wire 6, and brush H, to bar $l'$, conductors $l^7$, shaft $i^2$, brush $l^6$, and wire 4, back to generator. This reversal of current immediately changes the polarity of magnet D, and the latter is instantly thrown from disk C to its original position. The artificial load is now removed, and the circuit through magnet P is broken by the separation of the contacts $o$ and $o'$. A spring $p^2$ then draws lever $p'$ away from the pin $i^4$, with which it was engaged, and the switch continues its rotation until stopped by the engagement of pin $i^4$ with the pawl $i^6$, all of the devices being then in their normal positions.

The system described may be used either alone or in conjunction with a throttle-controlling device without in any manner increasing the work of the governor E, such a device being illustrated in Figs. 2, 3, and 9. The throttle $R^3$ (shown in Fig. 2) is regulated from a cylinder $r$, the piston of which is connected to the throttle by a rod $r'$. Steam is admitted to the cylinder for moving its piston and the rod $r'$ through valves which are opened and closed by a rod $r^2$, controlled in its movements by what is commonly known as a "floating link" $r^3$. Link $r^3$ is fulcrumed upon the end of rod $r^2$, and at one end it is connected by a link $r^4$ to rod $r'$ and at the other end it is connected to the core $s$ of a solenoid S, the latter being wound in sections $s'$ $s^2$ $s^3$, which are connected in the circuits controlled by the governor E, as illustrated in dotted lines in Fig. 3. When the circuits of the solenoid are broken, the core $s$ is withdrawn from the coils by a spring $s^4$, in which position the throttle is opened to its fullest extent. Section $s'$ is connected in the circuit controlling electromagnet $i$, section $s^2$ in the circuit controlling electromagnet $j$, and section $s^3$ in the circuit controlling electromagnet $k$. When the circuit of magnet $i$ is closed by the governor, section $s'$ becomes energized and draws the core $s$ into the coils a predetermined distance. The outer end of the link $r^3$ being held by the rod $r'$, rod $r^2$ will be pushed down for opening a valve controlling the admission of steam to the cylinder $r$. The piston of the cylinder will then move rod $r'$ until the outer end of link $r^3$ is moved thereby sufficiently to raise rod $r^2$ and close the valve. This movement of rod $r'$ results in partially closing the throttle $R^3$. Should the circuit of magnet $j$ be closed by the governor, section $s^2$ of the solenoid will become energized, the core $s$ will be drawn still farther into the coils, the steam-valve will again be opened and closed in the same manner by the movements of rod $r^2$, and the throttle will be again operated for still further reducing the supply of steam to the engine. When section $s^3$ of the solenoid is energized by the closing of the circuit of magnet $k$, the core $s$ will be drawn to the limit of its downward movement, and throttle $R^2$ will in consequence be entirely closed. As each circuit is opened by the action of the governor the core $s$ is lifted by a spring $s^4$ and rod $r^2$ is raised thereby for opening another valve which admits steam to the cylinder for moving rod $r'$ in a reverse direction and opening the throttle, the action of the floating link limiting the movement at each operation, as will be readily understood. It will thus be seen that when the brake or artificial load is applied to the engine the throttle is at the same time controlled for reducing the supply of steam, and the reduction of steam will continue as the artificial load increases, and when the latter decreases the steam-supply will be increased.

In the system illustrated in Fig. 3 the intensity or power of magnet D is regulated wholly by the strength of current. In the modified system illustrated in Fig. 13 the power of the magnet is regulated by the number of coils through which the current is passing. The magnet $D^2$ here shown is wound with three separate sets of coils, the terminals of the first set being indicated at 21 and 22, the terminals of the second set being indicated at 23 and 24, and the terminals of the third set at 25 and 26. The governor E and the contacts and circuits controlled thereby are the same as before described, and the rotary switches T, T', and $T^2$ are exact counterparts of switches J and K, and each is operated and controlled in the same manner. The positive and negative wires from the generator are indicated at 3 and 4, and the circuits of the electromagnets are connected as before. Wire 3 is connected by conductors 27 to the shafts of the three switches T, T', and $T^2$, and the brushes $t^3$, $t^4$, and $t^5$, which normally rest on insulated spaces of the switch-cylinders, are connected as follows: Brush $t^3$ is connected by wire 28 to terminal 21 of the first set of windings of magnet $D^2$, brush $t^4$ is connected by wire 29 to terminal 23 of the second set of windings, and brush $t^5$ is connected by wire 30 to terminal 25 of the third set of windings. The other terminals 22, 24, and 26 of the windings are each connected to wire 31, which is in turn connected to wire 4. When the speed of the engine increases, governor E operates to successively close the circuits of magnets $t$, $t'$, and $t^2$, and the switches T, T', and $T^2$ are revolved one-twelfth of a revolution, as before described. When the circuit of magnet $t$ is closed, brush $t^3$ is brought over a contact-bar of the switch-cylinder, and current passes from wire 3 through conductor 27, brush $t^3$, and wire 28, through the first set of windings of magnet $D^2$, and back to generator through wires 31 and 4. When the circuit of magnet $t'$ is closed, switch T' is operated in a similar manner to close the circuit through the second set of windings, and when the circuit of magnet $t^2$ is closed switch $T^2$ closes the circuit through the third set of windings, and as each of the governor-circuits is broken a winding is cut out of the circuit, as will be readily understood.

In applying my apparatus to engines of great power and speed I prefer to employ duplicate magnets operating on opposite sides of the disk C, as illustrated in Fig. 11, both magnets being connected in the system to operate in unison.

In Fig. 12 I have illustrated a mechanical brake which may be employed in the system illustrated in Fig. 13 in lieu of the electric brake or magnet there shown. This brake consists of a wheel U, keyed to any moving part of an engine or prime mover and supplied with a snubbing-post-acting band-brake $u$, anchored as at $u'$ and deriving its power from a lever $u^2$. Lever $u^2$ is connected to the core of a solenoid $v$, the latter being wound in sections in the same manner as the solenoid of the throttle-controlling device before described. The terminals of each section of the solenoid are connected in the system of Fig. 13 in the same manner as the windings of magnet $D^2$, so that each section will be cut into or out of circuit by the governor E in response to variations in speed and cause the core of the solenoid to apply, vary the power of, and release the brake, as will be readily understood.

When electric brakes are employed, I provide the magnets with water-spaces, as shown at $w$, Fig. 4, through which water is circulated for preventing the magnets from becoming unduly heated from frictional contact with disk C. In Fig. 10 I show a system for water circulation in which the magnets are supplied with water by a cupping device $w'$, arranged beneath the ship in position to take in water as the ship moves forward. The brake of Fig. 10 is shown as consisting of two magnets operating on opposite sides of the disk, as in Fig. 11. The water-space of one magnet is connected at its bottom to the cupping device $w'$ by a flexible tube $w^2$, and at its top it is connected by flexible tube $w^3$ to the bottom of the water-space of the other magnet, and from the top of this magnet a tube $w^4$ connects to an outlet $w^5$. When the ship is in motion, the cupping device forces water through tube $w^2$, to and through the water-space of one magnet through the connecting-tube $w^3$, to and through the water-space of the other magnet, and out through the tube $w^4$.

Having thus described my invention, what I claim as new, and desire to secure by Letters Patent, is—

1. In apparatus for governing and controlling engines or prime movers, the combination of a non-rotatable brake movable to and from a rotating part of the engine or prime mover, means for moving said brake into contact with said rotating part, and means whereby the pressure of said brake on the rotating part will be automatically varied in inverse proportion to variations in the working load carried by the engine, substantially as described.

2. In apparatus for governing and controlling engines or prime movers, the combination with a rotating part of the engine, of a non-rotatable brake movable to and from said rotating part, means for moving said brake into frictional contact therewith, and means for automatically varying the pressure of said brake upon said rotating part in proportion to variations in the speed of the engine, substantially as described.

3. In apparatus for governing and controlling engines or prime movers, the combination of a non-rotatable brake movable to and from a rotating part of the engine, and means for automatically varying the action of said brake in proportion to variations in the speed of the engine, substantially as described.

4. In apparatus for governing and controlling engines or prime movers, the combination with a rotating brake member driven by the engine and presenting a braking-face, of a non-rotating brake member movable to and from said rotating member and coöperating therewith to retard the speed of the engine, and electrically-actuated means for varying the action of the non-rotating member in proportion to variations in the speed of the engine, substantially as described.

5. In apparatus for governing and controlling engines or prime movers, the combination with a moving part of the engine presenting a braking-face, of a non-rotatable electrically-actuated brake movable to and from said moving part, electric circuits for controlling the movements and power of said brake, and a mechanical governor driven by the engine for controlling said circuits, substantially as described.

6. In apparatus for governing and controlling engines or prime movers, the combination with a moving portion of the engine, of a brake adapted to be moved into contact therewith for retarding the speed thereof, one or more electromagnets for controlling the application and power of said brake, a plurality of electric circuits controlling said magnets, and means for automatically making and breaking said circuits for energizing and varying the power of the brake, substantially as described.

7. In apparatus for governing and controlling engines or prime movers, the combination with a rotating part of the engine, of a metallic braking-face rotating therewith, a non-rotating electromagnetic brake movable to and from said braking-face, means for moving said brake into frictional engagement with said face for retarding the speed of the engine, and means for automatically varying the magnetic power thereof, substantially as described.

8. In apparatus for governing and controlling engines or prime movers, the combination with a rotating part of the engine, of a metallic braking-face rotating therewith, a non-rotating electromagnetic brake movable to and from said braking-face, and means for varying the magnetic energy of said brake in proportion to variations in the speed of the engine, substantially as described.

9. In apparatus for governing and controlling engines or prime movers, the combination with a rotating part of the engine, of a metallic braking-face rotating therewith, a non-rotating electromagnetic brake movable to and from said face, and means for automatically reversing the electric energy supplied to the brake, substantially as described.

10. In apparatus for governing and controlling engines or prime movers, the combination of an electromagnetic brake, a plurality of electric circuits for controlling the operation and power thereof, mechanically-driven rotating switches for controlling said circuits and a mechanical governor driven by the engine for controlling the operation of the switches, substantially as described.

11. In apparatus for governing and controlling engines or prime movers, the combination with a rotating braking-face, of a non-rotatable brake movable to and from said face, and means whereby the power of said brake will be automatically varied in proportion to variations in the speed of the engine or prime mover, substantially as described.

12. In apparatus for governing and controlling engines or prime movers, the combination of an electric brake adapted to be moved to and from a braking-face, a source of electric supply, a system of electric circuits between the source of supply and said brake adapted to be opened and closed for varying the power of the brake, switches for opening and closing said circuits, and means whereby said switches will be automatically operated by variations in the speed of the engine, substantially as described.

13. In apparatus for governing and controlling engines or prime movers, the combination with a rotating braking-face, of a non-rotatable brake movable to and from said face, and means for automatically applying, varying the pressure of, and removing said brake from contact with said face, substantially as described.

14. In apparatus for governing and controlling engines or prime movers, the combination of a centrifugal or other mechanical governor, a non-rotatable brake movable to and from a rotating part of the engine, and means controlled by said governor for applying, varying the power of and withdrawing said brake, substantially as described.

15. In apparatus for governing and controlling engines or prime movers, the combination of an electromagnetic brake, a source of electric supply, a system of connecting-circuits, switches in said circuits for making and breaking and reversing the current supplied to the brake, and a mechanical governor driven by the engine for controlling the action of said switches, substantially as described.

16. In apparatus for governing and controlling engines or prime movers, the combination of an electromagnetic brake, a source of electric supply, connecting-circuits between the brake and source of supply, mechanically-driven rotating switches in said circuits for making and breaking the current, devices for starting and stopping the rotation of said switches, and a mechanical governor driven by the engine for controlling said starting and stopping devices, substantially as described.

17. In apparatus for governing and controlling engines or prime movers, the combination of an electromagnetic brake, a source of electric supply, a system of connecting-circuits, mechanically-driven rotating switches in said circuits for making, breaking and reversing the current supplied to the brake, devices for starting and stopping the rotation of the switches, and a mechanical governor for controlling said starting and stopping devices, substantially as described.

18. In apparatus for governing and controlling engines or prime movers, the combination of an electromagnetic brake, a source of electric supply, a system of electric circuits between the brake and source of supply, switches in said circuits for making, breaking and reversing the current to the brake, electrically-actuated devices for controlling the operation of said switches, auxiliary circuits for controlling said devices, and a mechanical governor driven by the engine for making and breaking said auxiliary circuits, substantially as described.

19. In apparatus for governing and controlling engines or prime movers, the combination of an electrically-actuated brake movable to and from a rotating braking-face, a source of electric energy, a connecting-circuit, and means for automatically varying the resistance of said circuit, substantially as described.

20. In apparatus for governing and controlling engines or prime movers, the combination with a driving-shaft which is practically immovable longitudinally, and its load, of means for automatically applying, varying and removing an artificial load in inverse proportion to variations in the working load, substantially as described.

21. In apparatus for governing and controlling engines or prime movers, the combination with a moving part of the engine, of an electrically-actuated brake adapted to engage therewith for retarding the speed of the engine, electric circuits for controlling the application and power of the brake, and means for automatically sending current to the operating-coils of the brake in a reverse direction to the normal braking-current for quickly demagnetizing and reversing them, substantially as described.

22. In apparatus for governing and controlling engines or prime movers, the combination with a rotating braking-face, of an electrically-actuated brake movable to and from said face, electric circuits for controlling the movements and power of said brake, and means responsive to variations in the load carried by the engine for controlling and reversing the current in said circuits, substantially as described.

23. In apparatus for governing and controlling engines or prime movers, the combination with an electromagnetic brake, of means for sending current through the coils thereof, and a device for automatically making and breaking and reversing the normal braking-current, substantially as described.

24. As a governor for prime movers, the combination of a water-jacketed electromagnetic brake, means for automatically actuating said brake, and means for circulating water through the water-jacket of the brake, substantially as described.

25. As a governor for prime movers, a disk rotatably connected with the shaft of the mover, presenting a moving face, an electromagnet movable to and from the face of the disk, and a plurality of means for varying the electrical supply to the magnet, substantially as described.

26. As a governor for prime movers, a disk rotatably connected with the shaft of the mover, presenting a moving face, an electromagnetic system, presenting a magnetic surface movable to and from the face of such disk, means for varying the electrical supply to the magnet, responsive to the speed changes of the prime mover, and an independent manually-actuated means for controlling the strength of the current, substantially as described.

27. In a governor for engines or prime movers, a disk rotatively connected to the shaft of the mover presenting a braking-face, an electromagnetic system presenting a non-rotatable magnetic surface movable to and from the face of said disk, and means actuated by a centrifugal or other mechanical governor for varying the electrical energy supplied to the magnet, substantially as described.

28. As a governor for prime movers, a disk rotatably connected with the shaft of the mover presenting a moving face, an electromagnetic system presenting a magnetic surface movable to and from the face of such disk, and means for automatically reversing the direction of the current in the magnet, substantially as described.

29. As a governor for prime movers, a disk rotatably connected with the shaft of the mover presenting a moving face, an electromagnetic system presenting a magnetic surface movable to and from the face of such disk, means for varying the electrical supply to the magnet, and an automatically-operated step-by-step controller for the electrical circuits of the magnet, substantially as described.

30. As a governor for prime movers, a disk rotatably connected with the shaft of the mover presenting a moving face, an electromagnetic system presenting a magnetic surface movable to and from the face of such disk, means for varying the electrical supply to the magnet, and means called into action by the motion of one of the braking members for reversing the direction of current to the brake, substantially as described.

31. In apparatus for governing and controlling engines or prime movers, the combination with an engine-driving shaft, of a rotatable and a non-rotatable brake element, and means for moving one of said elements into frictional contact with the other independently of any movement of said shaft for retarding the speed thereof, substantially as described.

32. In apparatus for governing and controlling engines or prime movers, an electrical braking device and a centrifugal governor, both rotatably connected with a moving part, a source of electrical supply, rotating switches driven by the engine for handling the electrical energy to the brake, devices for holding said switches against rotation and operating connections between said devices and the governor, substantially as described.

33. In an electrical braking system for movers, a power-driven rotatable electrical switch for controlling the electrical energy to the brake, a catch for holding the switch against rotation, and means for automatically releasing the catch.

34. In an electrical braking system for movers, a power-driven electrical switch for controlling the electrical energy to the brake, a catch for holding the switch out of action, and means operated by a centrifugal governor for actuating the catch.

35. As a governor for marine engines, a pair of centrifugal governors, oppositely-moving parts, one actuated by each of said governors, and means for mechanically coupling the parts, substantially as described.

36. In an electric brake for engines or prime movers, a braking-face constituted of a plurality of electromagnetic poles, and a plurality of conductors suitably disposed with reference to the poles, each adapted to be independently excited, substantially as described.

37. In an electromagnetic friction device, a disk having circular grooves in its face, transverse grooves connecting the circular grooves leaving sector-like projections, and windings disposed within the grooves, wound upon three sides only of the said projections, substantially as described.

ELMER A. SPERRY.

Witnesses:
  EUGENE DUER,
  L. F. HALE.